United States Patent [19]
Camps

[11] 3,776,597
[45] Dec. 4, 1973

[54] WHEEL HUB ASSEMBLY
[76] Inventor: Javier Sanglas Camps, Paseo de Gracia 29, Barcelona, Spain
[22] Filed: Feb. 24, 1972
[21] Appl. No.: 228,984

[30] Foreign Application Priority Data
Feb. 26, 1971 Spain ................................ 389147

[52] U.S. Cl. .................................. 301/6 V, 188/26
[51] Int. Cl. .............................................. B60t 1/06
[58] Field of Search .................... 301/6 V, 6 E, 6 R, 301/6 CS; 188/26, 71, 73

[56] References Cited
UNITED STATES PATENTS
2,381,166  8/1945  Hollerith ............................. 301/6 E
2,540,039  1/1951  Weinheimer ........................ 188/26
2,612,968  10/1952  Hood .................................. 188/26
3,468,584  9/1969  Tantlinger ........................... 301/6 R FOREIGN PATENTS OR APPLICATIONS
257,391  5/1965  Austria ................................ 188/26
498,365  1/1939  Great Britain ....................... 188/26

Primary Examiner—Richard J. Johnson
Assistant Examiner—Reinhard Eisenzopf
Attorney—Harold D. Steinberg et al.

[57] ABSTRACT

A wheel hub assembly for a motorcycle has a fixed spindle and a boss rotatable about the spindle. A plate forming a brake disc projects radially from the boss and carries the wheel supporting structure on its outer periphery. Secured on the spindle, one to each side of the boss, are two members carrying opposed hydraulic cylinders. The cylinders apply brake blocks to the two faces of the brake disc.

4 Claims, 2 Drawing Figures

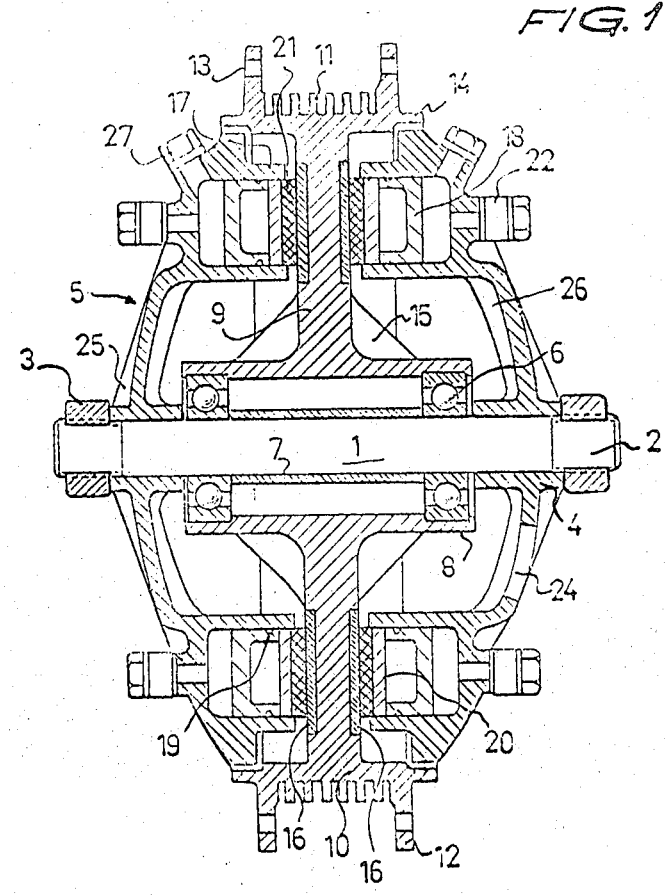

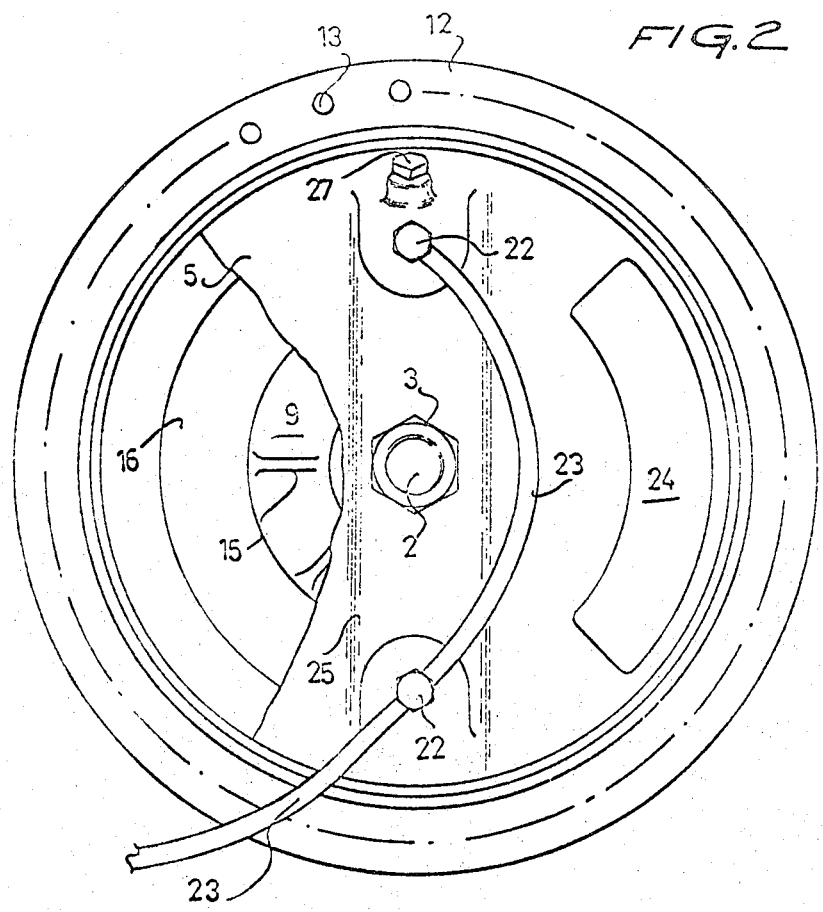

WHEEL HUB ASSEMBLY

The invention relates to a wheel hub assembly including a disc brake which is particularly simple and can be used with any vehicle of the motorcycle type.

SUMMARY OF THE INVENTION

According to this invention we provide a wheel hub assembly including a disc brake for a motorcycle having a spindle to be non-rotatably secured to the motorcycle frame and, supported on the spindle by bearings for rotation, a wheel boss from which extends radially a plate having parallel faces and constituting a brake disc, the periphery of which carries the structure by which the wheel is attached to the hub assembly, there being rigidly secured to the spindle, one to each side of the wheel boss, two members carrying opposed hydraulically actuated cylinders adapted to be connected with an external brake control circuit and provided with pistons carrying brake blocks which on operation of the cylinders engage with the respective faces of the said disc.

The members carrying the cylinders may be plates and these plates may be formed with ports oriented relative to the direction of travel of the vehicle, in such manner that a flow of cooling air is set up through the volume enclosed by the said plates.

In a preferred embodiment of the invention, the wheel boss, disc forming plate and the structure for attaching a wheel are constituted by a single moulded member and let into the faces of the said plate are plane, friction-resisting rings providing the surfaces engaged by the brake blocks.

DESCRIPTION OF THE DRAWINGS AND OF A PARTICULAR EMBODIMENT OF THE INVENTION

The accompanying drawings show, by way of example without limitation of the scope of the present invention and in diagrammatic form, a preferred embodiment of the said invention.

In the said drawings:

FIG. 1 is a diametral section of a wheel hub assembly according to the invention, applied to a free wheeling motorcycle wheel, and FIG. 2 is a side view of the assembly of FIG. 1, partly cut away.

The central element of the brake mechanism illustrated is a spindle 1 having threaded end portions 2 for nuts 3 permitting the securing to each other of the elements of the assembly and also of the whole assembly to the frame, fork or other suitable part of a motorcycle.

Secured on the spindle 1, between the nuts 3, are the bosses or hubs 4 of a plurality of plates or shields 5 described later, and the inner races of the ball bearings 6 maintained spaced from each other by means of the spacer sleeve 7. The outer races of the bearings 6 are in a conventional manner situated in the ends of a cylindrical wheel boss 8 which is rotatable about the spindle and from which extends radially, midway along its length and in the central plane of the wheel, a plate 9 at the peripheral edge of which there is a cylindrical wheel hub 10 formed with cooling fins 11 and having flanges 12 formed with orifices 13 for the wheel spokes and flanges 14 forming a labyrinth seal with the edges of the plates 5.

The rotatable assembly described including the boss 8, the plate 9 and hub 10 is a single casting of a light alloy and is also provided with radial reinforcing ribs 15 and has plane rings 16 made from a steel which will withstand the action of heat and friction and which are embedded in the faces of the plate 9 to constitute the friction surfaces of the brake. However, depending on constructional necessity, the said brake structure could be separated into the discrete structural elements required for the particular purpose and assembled in the appropriate form to afford the functional assembly described. Similarly, in the example illustrated, it has been assumed that the brake is for a freewheeling wheel, but it is obvious that it could equally well be provided with a sprocket wheel for transmission of the chain or gearing, in conventional manner.

The plates or shields 5 may be secured against rotation in a way similar or equivalent to what is used for conventional hub brake plates. They are provided, at diametrically opposite locations, with pairs of single-acting cylinders 17 the mouths of which are opposite the friction surfaces formed by the plane rings 16.

Freely displaceable within each cylinder 17 is a piston 18 having a packing ring 19 and carrying a support 20 for a brake block 21 opposite the said friction surface. The pistons are adapted to be urged into an inoperative position wherein the blocks are spaced from the rings 16 by means of conventional resilient devices (not shown). Their displacement towards the braking position shown is effected by the injection into the said cylinders 17 of a driving liquid, through the connections 22 and the conduits 23 constituting a part of a conventional braking circuit.

If desired, one or both of the plates 5 may be formed with ports such as the ports 24, which are appropriately oriented to set up currents of cooling air as a function of the travel of the vehicle or in combination with orifices formed like "impellers" through the plate 9.

The assembly may be completed by means of conventionally used auxiliary arrangements, such as reinforcing ribs 25 and 26 for the plates 5 and the bleeding connections 27 for the hydraulic system, or other arrangements such as mechanisms for adjusting the blocks in their inoperative or tensioned position.

The mode of functioning of the mechanism described is obvious. On the other hand, the adoption thereof will not require substantial conversion of the structure of conventional vehicles and it may also be adapted to existing motorcycles.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:

1. A wheel hub assembly for a motorcycle having a spindle to be non-rotatably secured to a motorcycle frame and, supported on the spindle by bearings for rotation, a wheel boss from which extends radially a plate having parallel faces and constituting a brake disc having a periphery which carries structure by which a wheel is attached to the hub assembly, there being rigidly secured to the spindle, one to each side of the wheel boss, two members carrying opposed hydraulically actuated cylinders adapted to be connected with an external brake control circuit and provided with pistons carrying brake blocks which on operation of the cylinders engage with respective opposed faces of the said disc.

2. A wheel hub assembly according to claim 1 wherein the said cylinder carrying members are plates.

3. A wheel hub assembly according to claim 2 wherein the said plates carrying the cylinders have ports oriented relative to the direction of travel of the vehicle in such a manner that a cooling flow is established through the volume enclosed by the said plates.

4. A wheel hub assembly according to claim 1 wherein the said boss, the said plate forming a brake disc and the said structure constitute a single moulded element, there being embedded in opposed faces of the plate, plane rings made of material resistant to the action of heat and friction, the rings providing surfaces engaged by the brake blocks.

* * * * *